United States Patent [19]
Yue

[11] Patent Number: 5,987,492
[45] Date of Patent: Nov. 16, 1999

[54] METHOD AND APPARATUS FOR PROCESSOR SHARING

[75] Inventor: Kelvin K. Yue, Sunnyvale, Calif.

[73] Assignee: Sun Microsystems, Inc., Palo Alto, Calif.

[21] Appl. No.: 08/962,140

[22] Filed: Oct. 31, 1997

[51] Int. Cl.$^6$ .................................................. G06F 9/00
[52] U.S. Cl. .................................. 709/102; 709/103
[58] Field of Search ................................ 709/100, 101, 709/102, 103, 107

[56] References Cited

U.S. PATENT DOCUMENTS

| | | | |
|---|---|---|---|
| 5,345,588 | 9/1994 | Greenwood et al. | 709/107 |
| 5,421,014 | 5/1995 | Bucher | 709/100 |
| 5,500,890 | 3/1996 | Rogge et al. | 379/91.02 |
| 5,687,390 | 11/1997 | McMillan, Jr. | 710/5 |
| 5,699,428 | 12/1997 | McDonall et al. | 380/4 |
| 5,812,533 | 9/1998 | Cox et al. | 370/259 |
| 5,822,588 | 10/1998 | Sterling et al. | 395/704 |

*Primary Examiner*—Majid A. Banankhah
*Attorney, Agent, or Firm*—Graham & James LLP

[57] ABSTRACT

A method and apparatus for implementing proportional sharing in a single processor system and/or in a multi-processor system. The invention can also implement proportional sharing in a system that executes multi-threaded computer programs. The invention uses the metaphor of "tickets." Each process in the system has a number of tickets and each ticket entitles the process to use a processor for a period of a time quantum. The operating system allocates the processor(s) first to the process with the highest number of tickets. As each process (or thread) finishes being executed for a predetermined amount of time, the tickets of that process/thread are adjusted accordingly and a new process (or thread) is chosen for execution. Tickets can be allocated to each process in the system. Alternatively, tickets can be allocated to each process and shared by all threads of the process. Alternatively, tickets can be allocated to a group of processes and shared by all processes within the group.

17 Claims, 15 Drawing Sheets

METHOD AND APPARATUS FOR PROCESSOR SHARING

FIELD OF THE INVENTION

This application relates to operating systems and, specifically, to a method and apparatus that allows processes to share one or more processors in a proportional manner.

BACKGROUND OF THE INVENTION

Most modern computer systems are multi-tasking systems. That is, they allow more than one "job" or "process" to be active at a given time. Since there is often only one processor in the system (or a number of processors less than the number of jobs/processes), it becomes necessary for the jobs/processes to share the processor resources. In a shared processor system, a processor spends some time executing part of a first job/process before switching to execute part of another job/process. Thus, to a human user, it appears that more than one job/process is being executed at a given time.

When multiple applications, processes, or jobs are sharing one or more processors in a computer system, an equitable method of processor sharing needs to be determined. For instance, Job A might be twice as urgent as Job B. As another example, if User X and User Y share a computer system and User X pays a fee three times as much as User Y pays, then User X wants to be allocated three times more processor resources than User Y.

Moreover, some computer systems execute "multi-threaded" computer programs in which multiple "threads" of a process can be executing at the same time. Multi-threading adds an extra note of complexity to the operating system and to processor sharing.

As an example, many conventional operating systems use a priority-based approach to allocate jobs, threads, users, or processes to one or more processors. Thus, jobs having the highest priority execute before jobs having a lower priority. In some conventional operating systems, a high priority job will run until it is done before a lower priority job gets to run.

In at least one implementation of the Solaris operating system (available from Sun Microsystems, Inc), a highest priority job will run for a period of time and then its priority is redetermined. There are currently four different scheduling classes that define the priorities of the applications in a conventional Solaris system: Real Time (RT); System (SYS); Interactive (IA), and Timesharing (TS). If, after its execution, a job still has the highest priority in the system, it is allowed to run for another period of time (e.g., between 20 to 200 milliseconds), after which the priority is redetermined again. If it is no longer the highest priority job in the system after the redetermination, then a job that has a higher priority gets to run. Unfortunately, if a job maintains a highest priority, other applications do not always get a chance to execute.

SUMMARY OF THE INVENTION

A first preferred embodiment of the present invention provides a method and apparatus for implementing proportional sharing among single-threaded applications in a single processor system and/or in a multi-processor system. A second preferred embodiment of the present invention provides a method and apparatus that implements proportional sharing among multi-threaded applications in a single processor system and/or a multiple processor system. A third preferred embodiment of the present invention provides a method and apparatus that implements hierarchical sharing among the jobs of users in a single processor system and/or a multiple processor system. Each of these preferred embodiments is described below in detail.

The present invention uses the metaphor of "tickets." In a preferred embodiment, each process in the system has a number of tickets and each ticket entitles a thread of the process to use a processor for a period of a time (a "time quantum"). The operating system allocates processor time first to a thread of the process having the highest number of tickets. As each thread (or process) finishes being executed for a predetermined amount of time, the tickets of that process to which the thread belongs are adjusted accordingly and a new thread is chosen for execution.

As an example, if the ratio of processor allocation for process A and process B is x:y, then process A is given x tickets and process B is given y tickets. The priority of a process (or of threads of the process) is calculated based on the number of tickets that the process currently has. The more tickets a process currently has, the higher the priority of its threads.

The operating system picks for execution the waiting thread that has the highest priority. Each time a thread is picked for execution, the number of tickets that its process currently has is reduced. If the number of tickets held by a process falls to zero, the number of tickets is reset to its initial number of tickets. Tickets can be allocated to each process in the system. Alternatively, tickets can be allocated to each process and shared by all threads of the process. Alternatively, tickets can be allocated to a group of processes and shared by all processes within the group.

Alternatively, tickets can be assigned at the user level and shared by all jobs of a particular user.

In accordance with the purpose of the invention, as embodied and broadly described herein, the invention relates to a method of sharing at least one processor in a data processing system between a plurality of processes, including the steps, performed by the data processing system, of: initially assigning a number of tickets to each of the plurality of processes; assigning an initial priority to a thread of each of the plurality of processes in accordance with the number of tickets assigned to the process associated with the thread; and executing the respective threads of the plurality of processes in an order indicated by the tickets assigned to the plurality of processes, so that the proportion of execution time between any two of the threads is the same as the proportion between the number of tickets of the two processes associated with the threads.

In further accordance with the purpose of the invention, as embodied and broadly described herein, the invention relates to a method of sharing a processor between a plurality of threads of a plurality of multi-threaded applications in a data processing system, including the steps, performed by the data processing system, of: initially assigning respective numbers of tickets to each of the plurality of multi-threaded applications; assigning a priority to each of the plurality of multi-threaded applications in accordance with a number of tickets assigned to each multi-threaded application; adding a thread of at least one of the plurality of multi-threaded applications to a ticket queue, when there is not room for another process on a dispatch queue; and adding a thread of at least one of the plurality of multi-threaded applications to a dispatch queue when room becomes available for another thread on a dispatch queue.

In further accordance with the purpose of the invention, as embodied and broadly described herein, the invention relates to a method of sharing at least one processor between a plurality of threads of a first multi-threaded process and a plurality of threads of a second multi-threaded process in a data processing system, including the steps, performed by the data processing system, of: initially assigning a respective numbers of tickets to the first and second multi-threaded processes; assigning a priority to at least one thread of each of the first and second multi-threaded processes in accordance with the number of tickets assigned to each multi-threaded process; and executing the threads of the first and second multi-threaded processes in an order indicated by the tickets assigned to their respective multi-threaded process, so that the proportion of execution time between any two of the processes is the same as the proportion between the number of tickets of the two multi-threaded processes.

In further accordance with the purpose of the invention, as embodied and broadly described herein, the invention relates to a data structure stored in a memory storage area of a data processing system, comprising: a data structure representing a first thread of a multi-threaded process; a data structure representing a second thread of a multi-threaded process; and a ticket queue data structure, that is pointed to by the data structures representing the first and second threads, where the ticket queue data structure stores a value indicating an initial number of tickets for the multi-threaded process to which the first and second threads belong and further storing a value indicating a current number of tickets for the multi-threaded process.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, sever to explain the principles of the invention.

DETAILED DESCRIPTION OF PREFERRED EMBODIMENTS

Reference will now by made in detail to preferred embodiments of the invention, examples of which are illustrated in the accompanying drawings. Wherever convenient, the same reference numbers will be used throughout the drawings to refer to the same of like parts.

I. Overview

The present invention can be implemented on a wide variety of data processing systems, including systems that execute single-threaded applications and/or multi-threaded applications and that include a single processor or multiple processors. FIGS. 1–4 show respective examples of each of these systems The present invention uses the metaphor of "tickets." In a preferred embodiment of the present invention, each process in the system has a number of tickets and each ticket entitles a thread of the process to use a processor for a period of a time (a "time quantum"). The operating system allocates processor time first to a thread of the process having the highest number of tickets. As each thread (or process) finishes being executed for a predetermined amount of time, the tickets of that process to which the thread belongs are adjusted accordingly and a new thread is chosen for execution. In one embodiment, a ticket owner can only have numbers of tickets that are positive integer values or zero.

In a preferred embodiment, each process in the system has a number of tickets and each ticket entitles a thread of the process to use a processor for a period of a time ( a "time quantum").

Figure 1:
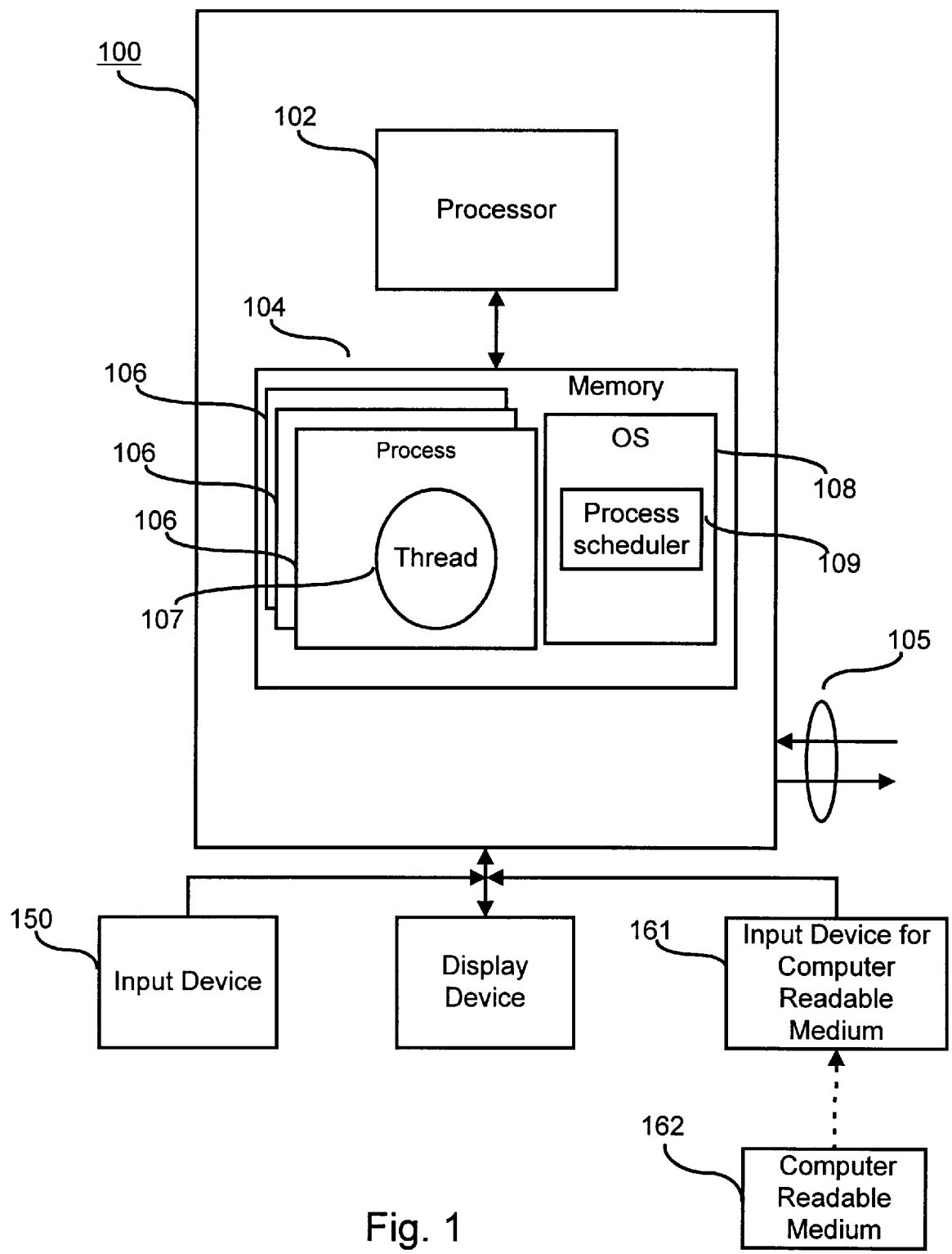
FIG. 1 shows an example of a plurality of single-threaded applications executing on a data processing system having a single processor, in accordance with a first preferred embodiment of the present invention.

FIG. 1 is a block diagram of a data processing system 100 having a single processor 102; a memory 104; input/output lines 105; an input device 150, such as a keyboard, a mouse, or a voice input device; and a display device 160, such as a display terminal. Data processing system 100 also includes an input device 161, such as a floppy disk drive, CD ROM reader, or DVD reader, that reads computer instructions stored on computer readable medium 162, such as a floppy disk, a CD ROM, or a DVD drive. These computer instructions are the instructions of e.g., process scheduler software 109.

Memory 104 includes one or more single-threaded applications (also called "processes") 106, each of which contains a thread 107. Memory 104 also includes an operating system (OS) 108, which includes process scheduler software 109. The steps of the described embodiment of the present invention are performed when instructions in process scheduler software 109 are performed by processor 102. Data processing system 100 (and other data processing system discussed herein) can be, for example, a SPARC chip based system, an Ultra server, or an Enterprise server (all of which are available from Sun Microsystems, Inc.). Data processing system 100 can also be any other appropriate data processing system.

Operating system 108 can be, for example, a variation of the Unix operating system that has been modified to incorporate the present invention. UNIX is a registered trademark in the United States and other countries and is exclusively licensed by X/Open Company Ltd. Operating system 108 can be, for example, a variation of the Solaris operating system, available from Sun Microsystems, Inc. that incorporates the functionality of the present invention.

It will be understood that the present invention can also be performed in a distributed data processing system, where the processor(s) and memory are located in different machines. It will also be understood that the present invention can also be implemented in a distributed system, where the processes, threads, and/or processors are not all in the same computer. The present invention allows processes 106 to proportionally share processor 102, as will be described below.

A person of ordinary skill in the art will understand that memory 104 also contains additional information, such as application programs, operating systems, data, etc., which are not shown in the figure for the sake of clarity. It also will be understood that data processing system 100 (or any other data processing system described herein) can also include numerous elements not shown, such as disk drives, keyboards, display devices, network connections, additional memory, additional CPUs, LANs, input/output lines, etc.

In the following discussion, it will be understood that the invention is not limited to any particular implementation or programming technique and that the invention may be implemented using any appropriate techniques for implementing the functionality described herein. The invention may be implemented in any appropriate operating system using any appropriate programming language or programming techniques.

Figure 2:
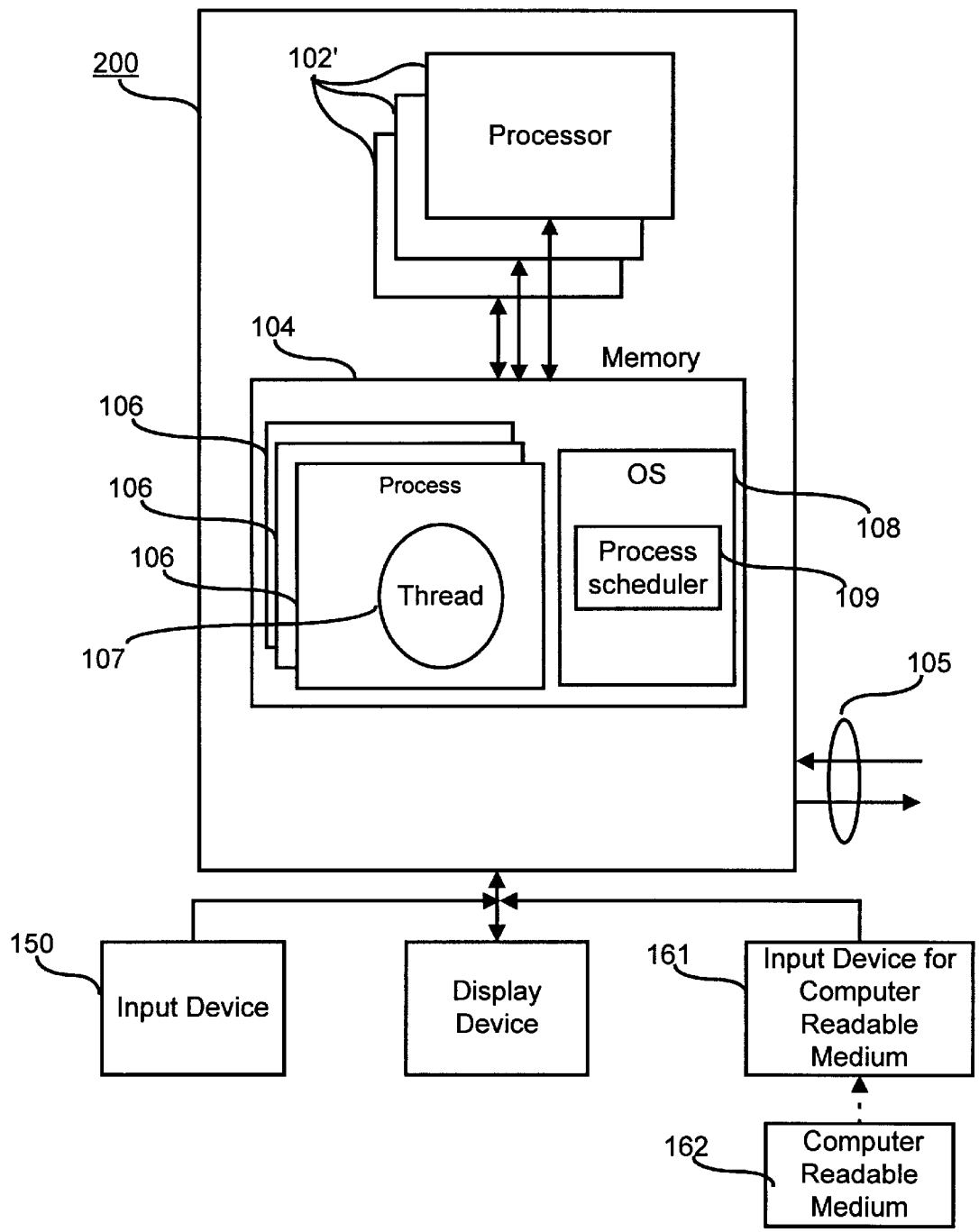
FIG. 2 shows an example of a plurality of single-threaded applications executing on a data processing system having multiple processors, in accordance with a second preferred embodiment of the present invention.

FIG. 2 is a block diagram of a data processing system 200 having multiple processors 102' and a memory 104. Memory 104 includes one or more single-threaded applications (also called "processes") 106, each of which contains a thread 107. Memory 104 also includes an operating system (OS) 108, which includes process scheduler software 109. The steps of the described embodiment of the present invention are performed when instructions in process scheduler software 109 are executed by one or more of processors 102'. The present invention allows applications 106 to proportionally share processors 102', as will be described below.

Figure 3:
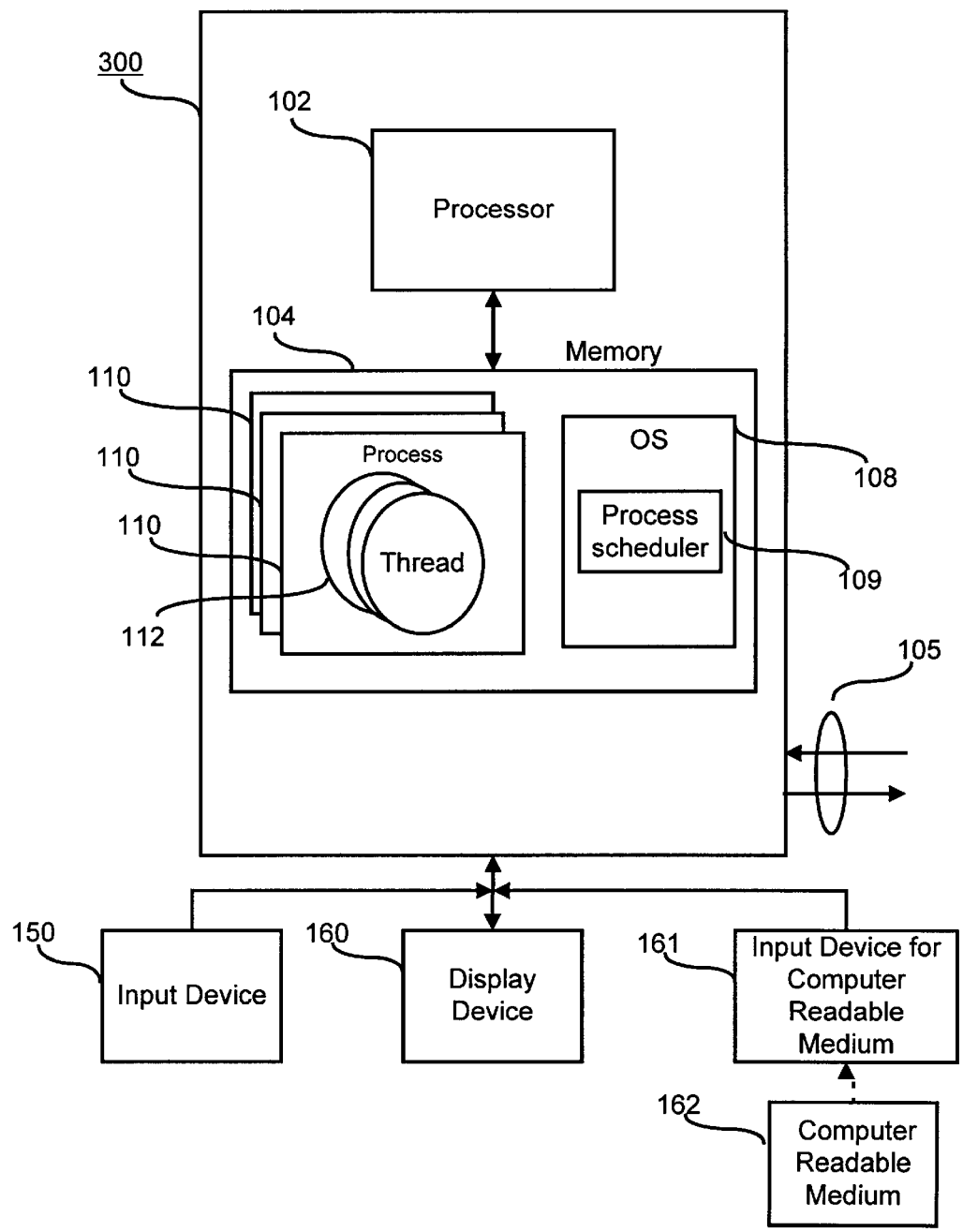
FIG. 3 shows an example of a plurality of multi-threaded applications executing on a data processing system having a single processor, in accordance with a third preferred embodiment of the present invention.

FIG. 3 is a block diagram of a data processing system 300 having a single processor 102 and a memory 104. Memory 104 includes one or more multi-threaded applications (also called "processes") 110, at least one of which contains a plurality of threads 112. Memory 104 also includes an operating system (OS) 108, which includes process scheduler software 109. The steps of the described embodiment of the present invention are performed when instructions in process scheduler software 109 are executed by processor 102. The present invention allows the threads 112 of each multi-threaded application/process 110 to proportionally share processor 102, as described below.

Figure 4:
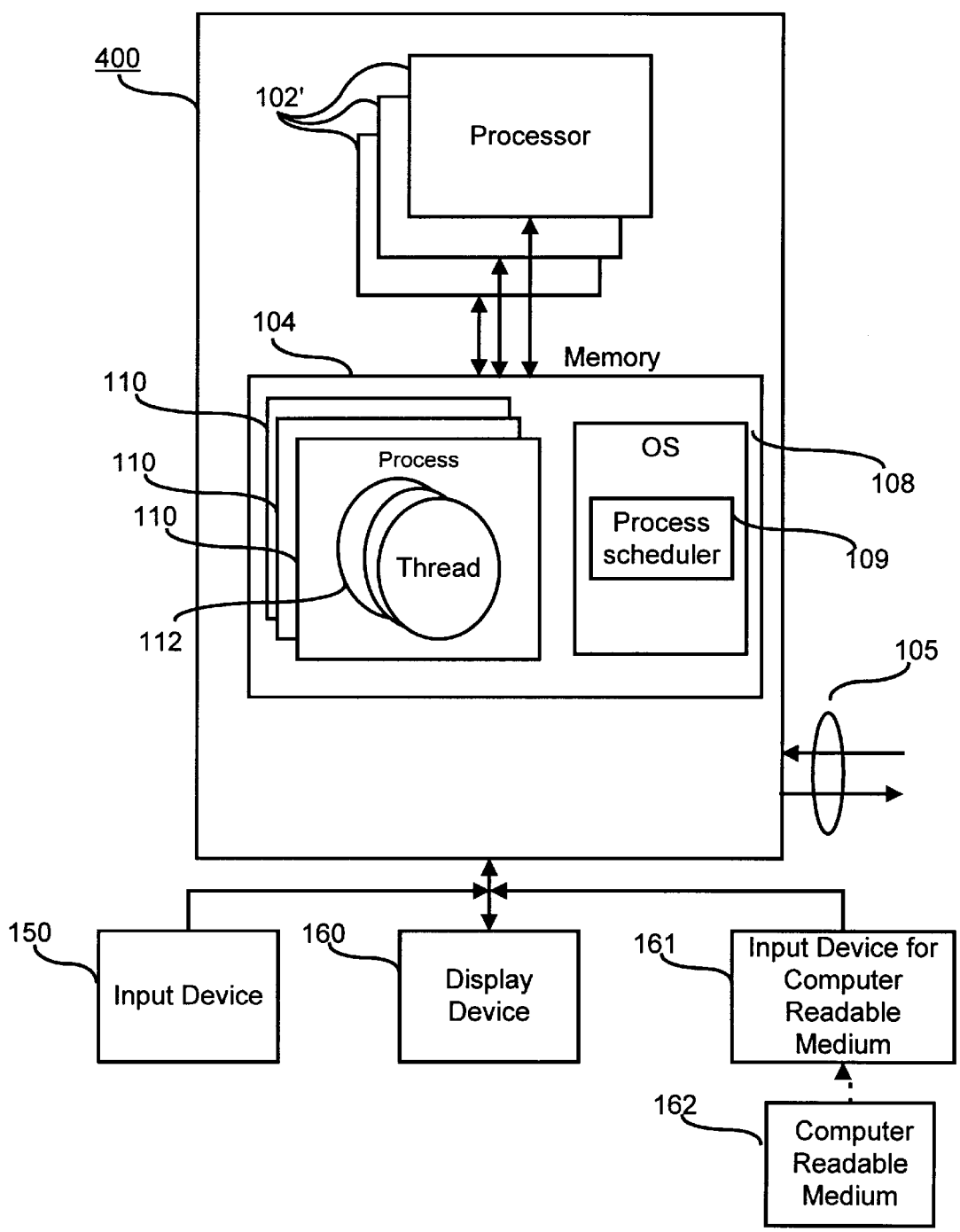
FIG. 4 shows an example of a plurality of multi-threaded applications executing on a data processing system having multiple processors, in accordance with a fourth preferred embodiment of the present invention.

FIG. 4 is a block diagram of a data processing system 400 having multiple processors 102' and a memory 104. Memory 104 includes one or more multi-threaded applications 110 (also called a "process"), at least one of which contains a plurality of threads 112. Memory 104 also includes an operating system (OS) 108, which includes process scheduler software 109. The steps of the described embodiment of the present invention are performed when instructions in process scheduler software 109 are executed by one or more of processors 102'. The present invention allows the threads 112 of each multi-threaded application/process 110 to proportionally share processors 102', as described below.

II. Single-threaded Applications

The following paragraphs discuss several preferred embodiments of the present invention that are applicable when the system is executing single-threaded applications (also called "processes"). FIGS. 5 and 6 relate to single-threaded applications. FIGS. 7 and 8 relate to multi-threaded applications.

Figure 5A:
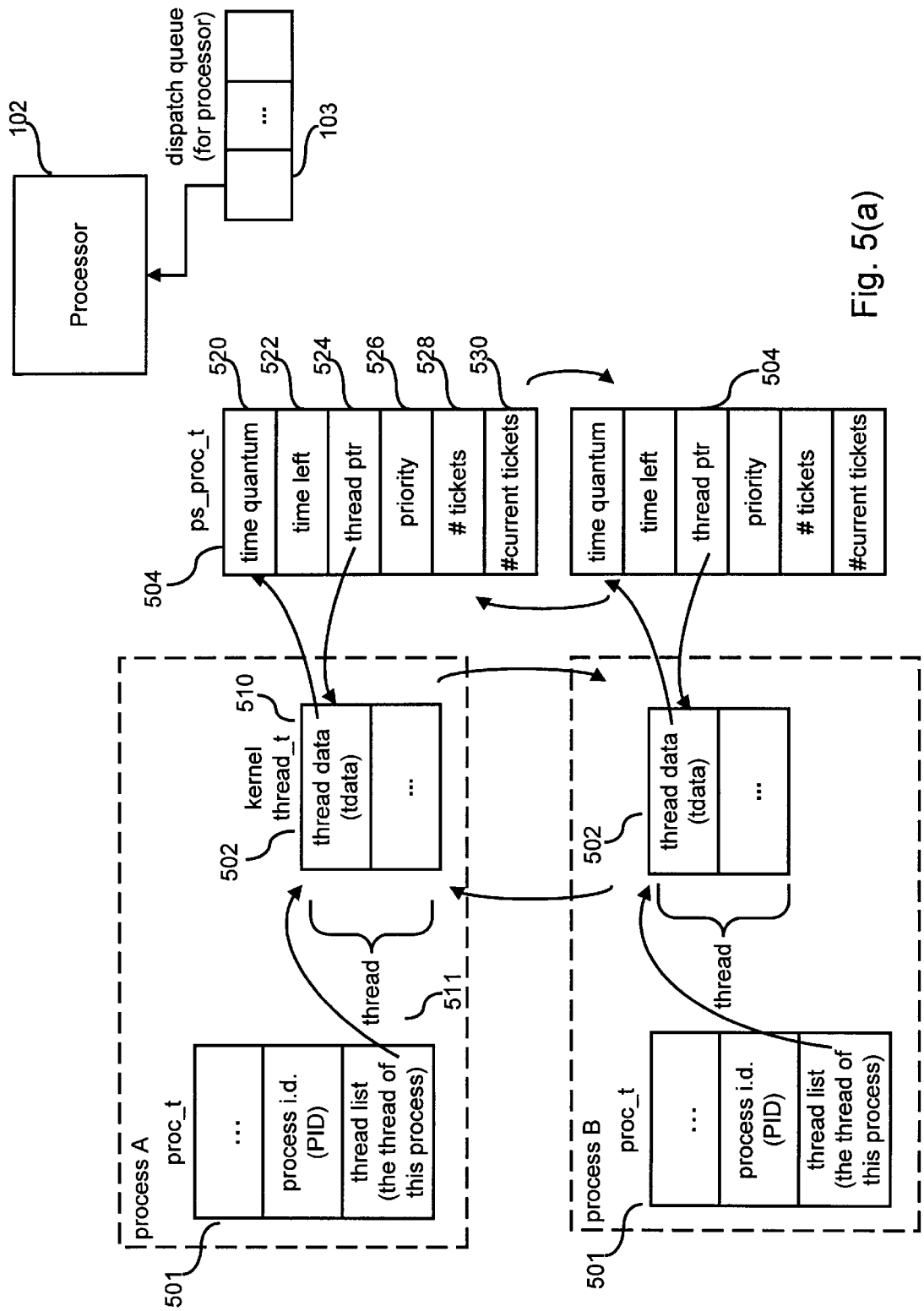
FIG. 5(a) shows an example of a data structure used to implement a preferred embodiment of the present invention in a system where single-threaded applications share a single processor (such as the system of FIG. 1).
Figure 5B:
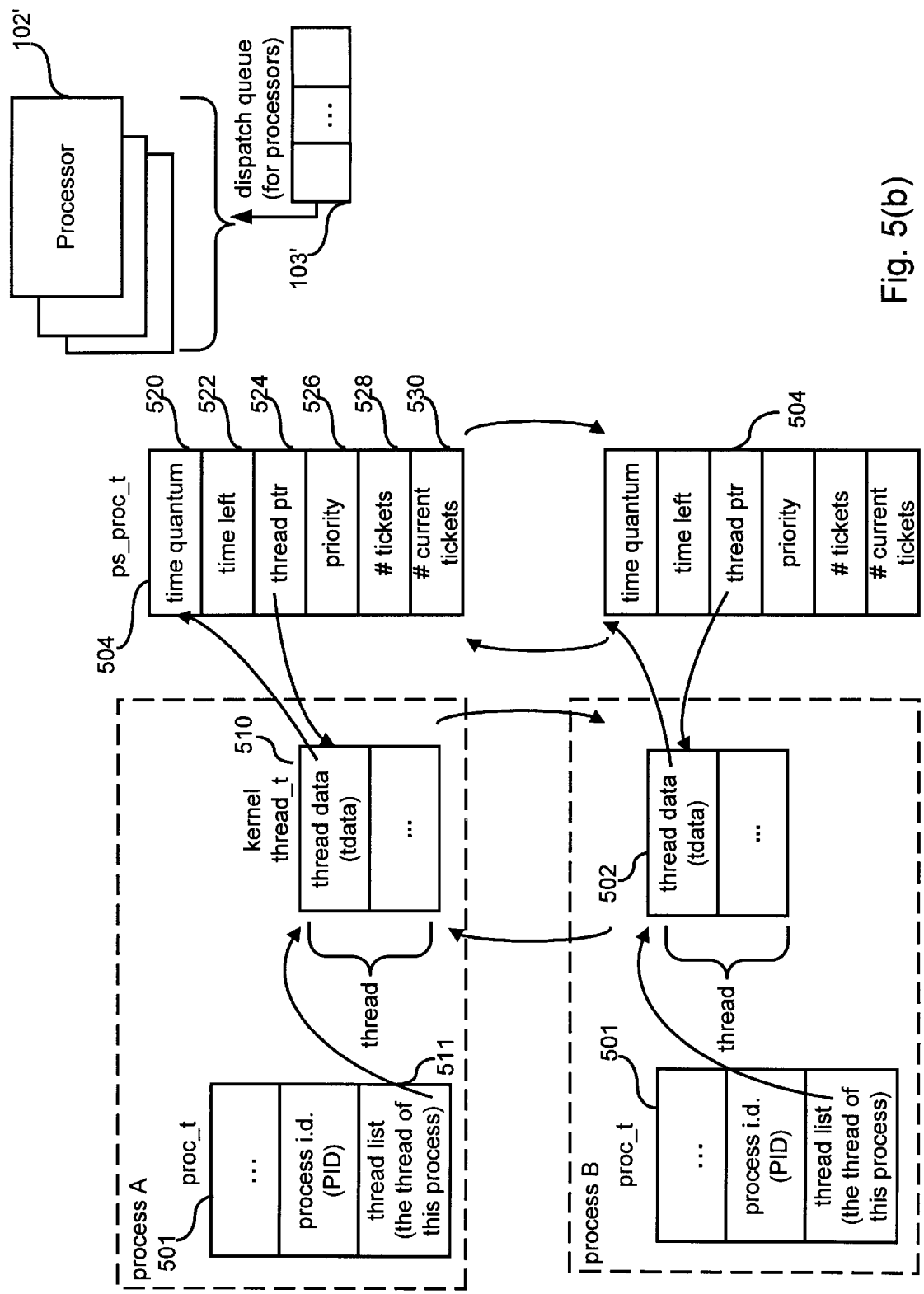
FIG. 5(b) shows an example of a data structure used to implement a preferred embodiment of the present invention in a system where single-threaded applications share multiple processors (such as the system of FIG. 2).

With regard to single-threaded applications, FIG. 5(a) shows an example of a data structure used to implement a preferred embodiment of the present invention in a system where single-threaded applications share a single processor (such as the system of FIG. 1). FIG.5(b) shows a data structure used in a system where single-threaded applications share multiple processors 102'. Both Figures show data structures for two single-threaded applications (Process A and Process B), although it should be understood that any appropriate number of processes/applications can be executing in the system.

FIG. 5(a) shows a proc_t data structure 501 for each process 106 being executed by the system and a thread_t data structure 502 for each thread being executed by the system. Each proc_t data structure 501 points to the thread_t data structure 502 of its thread via a thread list pointer 511. Each single-threaded application will have only one thread. Each thread_t data structure 502 points to a ps_proc_t data structure 504 via a thread data pointer in field 510.

Each ps_proc_t data structure 504 preferably includes a time quantum field 520, a time left field 522, a thread pointer field 524, a priority field 526 (containing a priority for the process/thread), a #tickets field 528 (containing an initial number of tickets assigned to the process/thread), and a #current tickets field 530 (containing a number of tickets currently held by the process/thread). Processes/threads waiting to be executed by processor 102 are temporarily placed in dispatch queue 103.

Processes/threads are executed by processor 102 for a preferred time quantum 520. During execution of a process/thread, the amount of time remaining of a current time quantum is stored in timeleft field 522. When a thread or process is picked to run on a processor, the timeleft field 522 of the thread/process is set to equal its time quantum. For example, if a time quantum is 100 milliseconds (10 clock ticks), timeleft field 522 is initially set to 10 ticks. Timeleft field 522 is decremented by OS 108 for every clock tick that a processor executes the thread/process. Timeleft field 522 is needed because every so often the processor is interrupted during execution of the thread/process to perform some other function. The timeleft field 522 is used to keep track of how much of a time quantum is used up for a thread/process. When timeleft field 522 is zero, it is time for the thread/process to give up the processor and recalculate its priority.

FIG. 5(b) shows an example of a data structure used to implement a preferred embodiment of the present invention in a system where single-threaded applications share multiple processors 102' (such as the system of FIG. 2). The Figure shows data structures for two single-threaded applications (Process A and Process B), although it should be understood that any appropriate number of processes can be executing in the system.

Figure 6A:
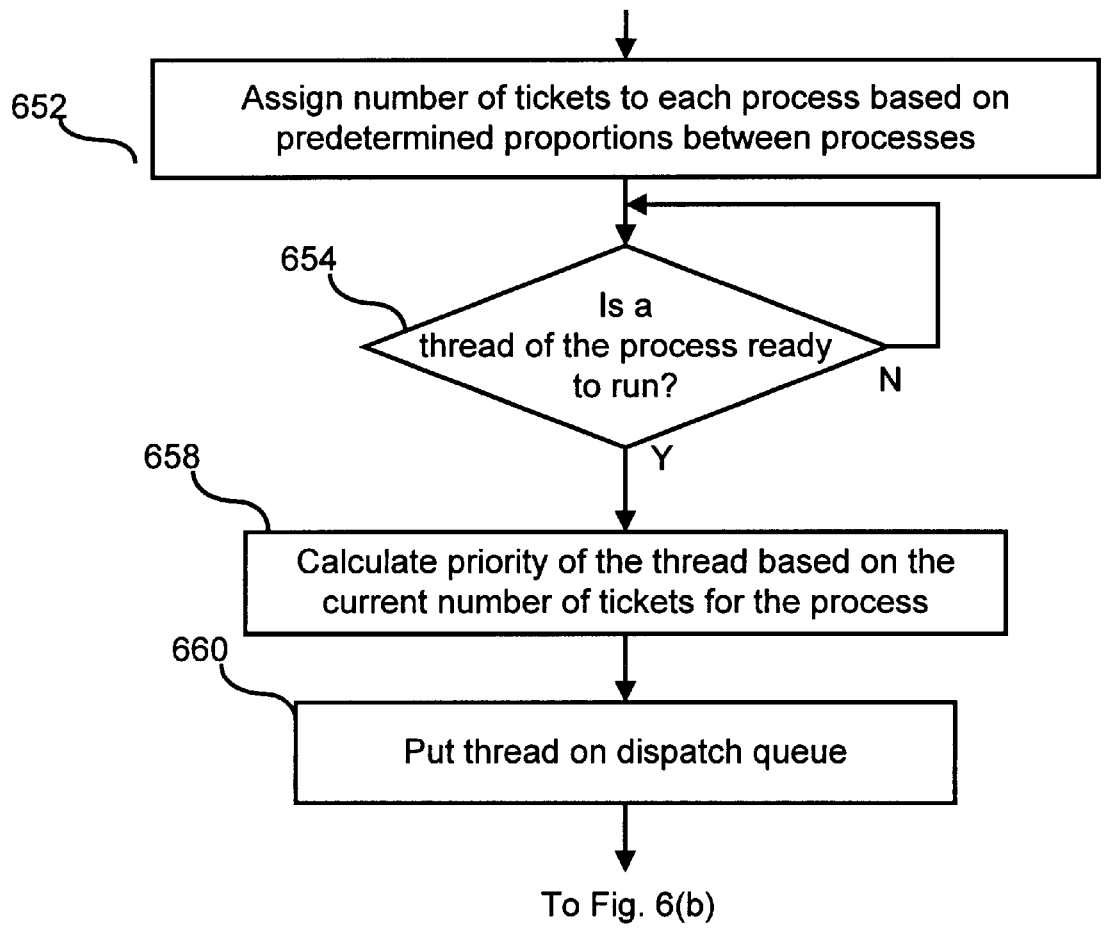
FIGS. 6(a) and 6(b) are flow charts showing steps using the data structure of FIGS. 5(a) or 5(b).
Figure 6B:
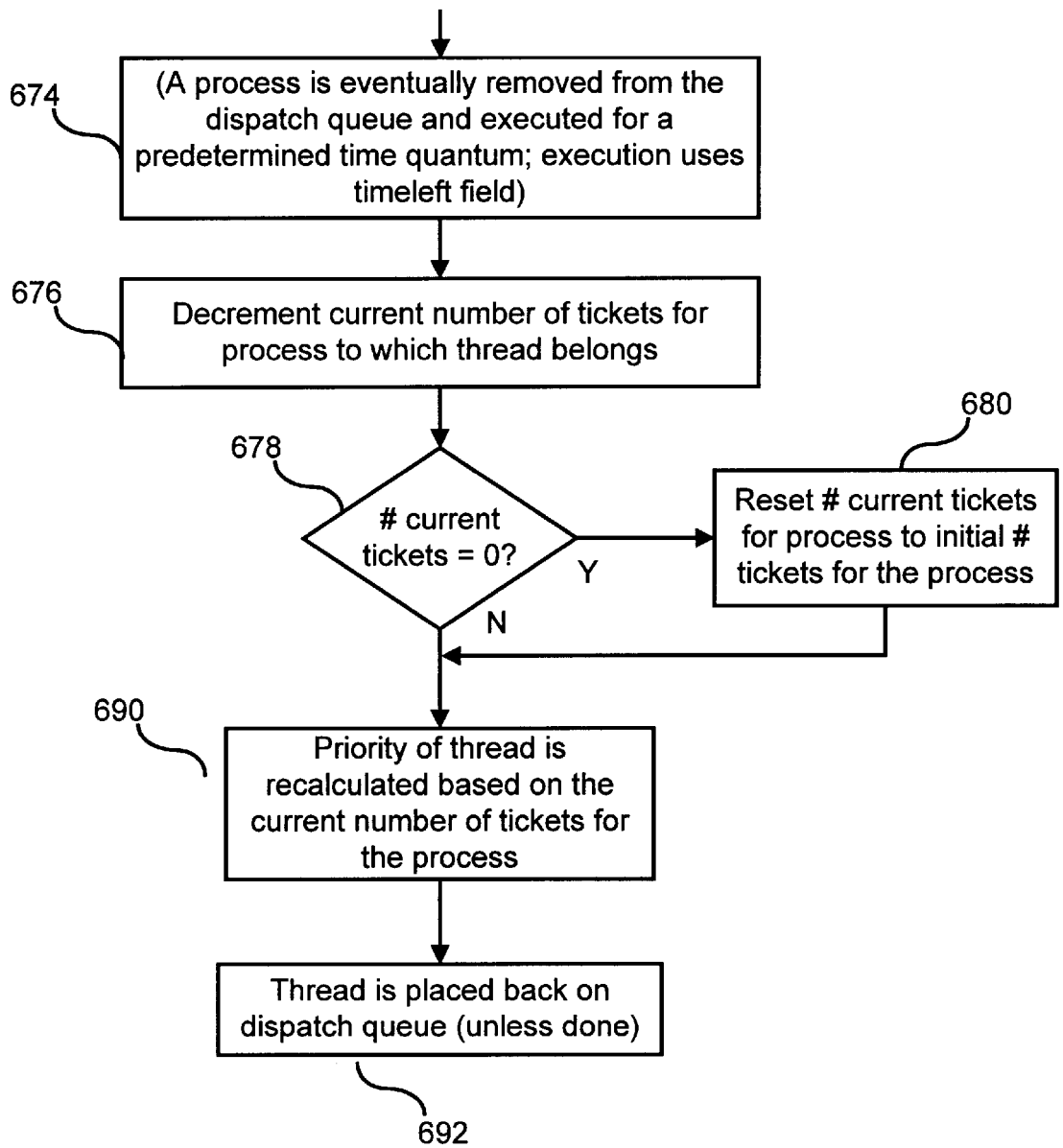

FIGS. 6(a) and 6(b) are flow charts showing steps performed in the data processing system of FIGS. 5(a) or 5(b).

It will be understood that, in the example, the steps of FIGS. 6(a) and 6(b) are performed by process scheduling software 109 being executed by processor 102, 102', or some other appropriate processor. In a preferred embodiment of the present invention, operating system 108 is based on the Solaris operating system, which is available from Sun Microsystems, Inc. The steps of FIGS. 6(a) and 6(b) preferably are implemented by modifying the RT scheduling class of Solaris. In such an implementation, two new fields (#tickets and #current tickets) are preferably added to the rt_proc structure (here called ps_proc_t). The Solaris function rt_tick is also preferably modified, as described below, to calculate the new priority in accordance with a number of tickets held, to reduce the number of tickets after a process/thread has executed for a predetermined time quantum, and to decide whether the current thread should continue to use the processor(s).

The following table shows an example of two processes: Process A and Process B executing concurrently and sharing a processor in a ratio of 2:1. The table will be discussed in connection with the steps of FIGS. 6(a) and 6(b).

|      | Process A |       |          | Process B |       |          |
| ---- | --------- | ----- | -------- | --------- | ----- | -------- |
| Time | # Tkts    | State | Priority | # Tkts    | State | Priority |
| 0    | 2         |       | 52       | 1         |       | 51       |
| 1    | 1         | Run   | 52       | 1         |       | 51       |
| 2    | 1         |       | 51       | 1         | Run   | 51       |
| 3    | 2         | Run   | 51       | 1         |       | 51       |
| 4    | 1         | Run   | 52       | 1         |       | 51       |
| 5    | 1         |       | 51       | 1         | Run   | 51       |
| 6    | 2         | Run   | 52       | 1         |       | 51       |

Initially, in step 652 of FIG. 6(a), Process A is assigned 2 tickets and Process B is assigned 1 ticket. These values are stored in #tickets field 528 and #current tickets field 530 for each process. Thus, the proportion of execution time between any threads of the two processes is to be 2:1 because that is the ratio between the number of tickets assigned to the two processes. The thread of Process A is assigned an initial priority of 52 (50+2) and the thread of Process B is assigned an initial priority of 51 (50+1). The initial priority of "50" is arbitrary in the example, and can be any appropriate value in an implementation of the invention. These priorities are stored in field 526 for each process.

In step 654, it is determined that a thread of Process A is ready to run. A priority for the thread of Process A is calculated in step 658 based on a number of tickets of Process A. Thus, the thread of Process A is placed in dispatch queue 103 (or 103') in step 660.

As shown in FIG. 6(b), in step 674, the thread of Process A is eventually removed from the dispatch queue for execution by a processor when it has a highest priority in the dispatch queue. The thread of Process A is executed by one of processors 102, 102' for a predetermined time quantum (for example, 100 milliseconds, although any appropriate time quantum can be used). During execution, timeleft field 522 is decremented while the thread of the process is executed during its time quantum. At the end of execution, timeleft field 522 is zero.

When the time quantum of its executing thread expires, the number of tickets held by Process A is decremented by a predetermined number (such as "1") in step 676. If the number of tickets held by the process is "0" in step 678, the number of tickets for the process is reset to the initial value for the process in step 680 and control passes to step 690. Otherwise, control passes to step 690. In the example, the number of tickets is decremented from 2 to 1. This value is stored in #current tickets field 530 for Process A.

In step 690, the priority of the thread of Process A is recalculated. In the example, the priority of the thread of Process A is 51, since the number of current tickets held by Process A is 1. In step 692 the thread is placed back on the dispatch queue (since, of course it has not completed execution).

In the example, control then passes to the step 674 of FIG. 6(b), where it is determined that, since the thread of Process B has the same priority as the thread of Process A, the thread of Process A will wait and the thread of Process B will execute. (The thread of process B was previously placed on the dispatch queue). After the thread of Process B executes for the predetermined amount of time, the number of tickets that Process B has is reduced by "1," giving Process B zero tickets. In step 680, the #current tickets 530 held by Process B is set back to its initial value "1". The priority for the thread of Process B is then recalculated, still yielding a priority of "51". Since the thread of Process A has the same priority, the thread of Process A executes next. After the thread of Process A executes, the number of current tickets of process A is reduced to "0" and reset back to "2".

The steps of FIG. 6(b) are repeated as shown in the table until both Process A and Process B have executed completely. Note that, in the example, the thread of Process A executes for four quantum time units, while the thread of Process B executes for two quantum time units. This yields an execution ratio of 2:1 while the processes are competing for the processor(s).

As an additional example, if Process A is a process or application having a short execution time and Process B has a long execution time (and assuming that there are only two executing processes), then process B will have all the execution time after Process A is done executing. The described embodiment of the present invention preserves proportionality whenever both applications are competing for the processor.

As an additional example, if Processes A and B are both long-running applications, but process A stops in the middle to wait for some inputs from the user, Processes A and B will have a ratio of 2:1 until Process A stops. Then Process B will have all the processor time while Process A is waiting for inputs. After the user enters his input, Processes A and B will have a ratio of 2:1 again. However, the ratio between the total processor time spent on each job is skewed by how long the wait time is for Process A. Again, the described embodiment of the present invention preserves proportionality whenever both applications are competing for the processor.

III. Multi-threaded Applications

Figure 7A:
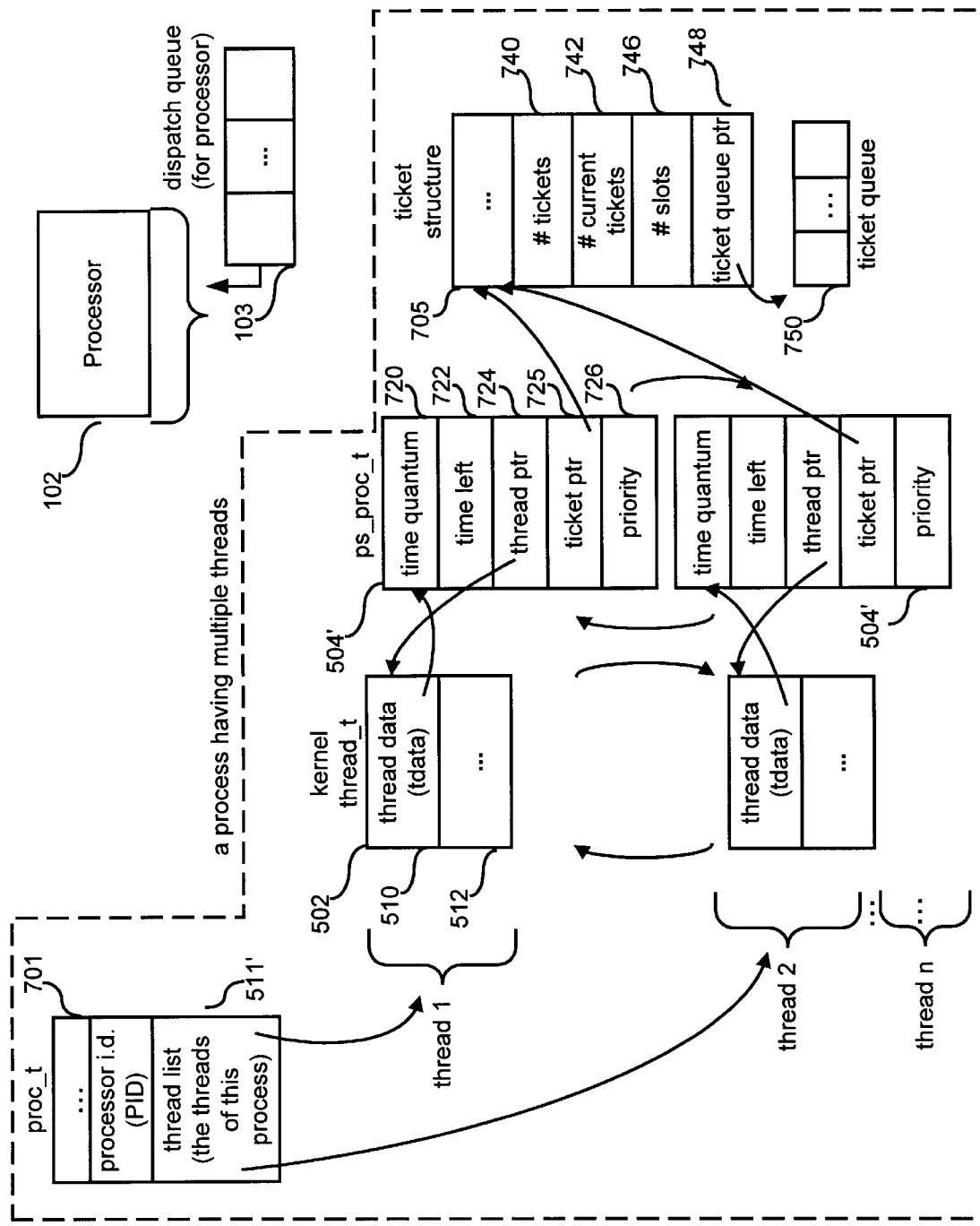
FIG. 7(a) shows an example of a data structure used to implement a preferred embodiment of the present invention in a system where multi-threaded applications share a single processor (such as the system of FIG. 3).
Figure 7B:
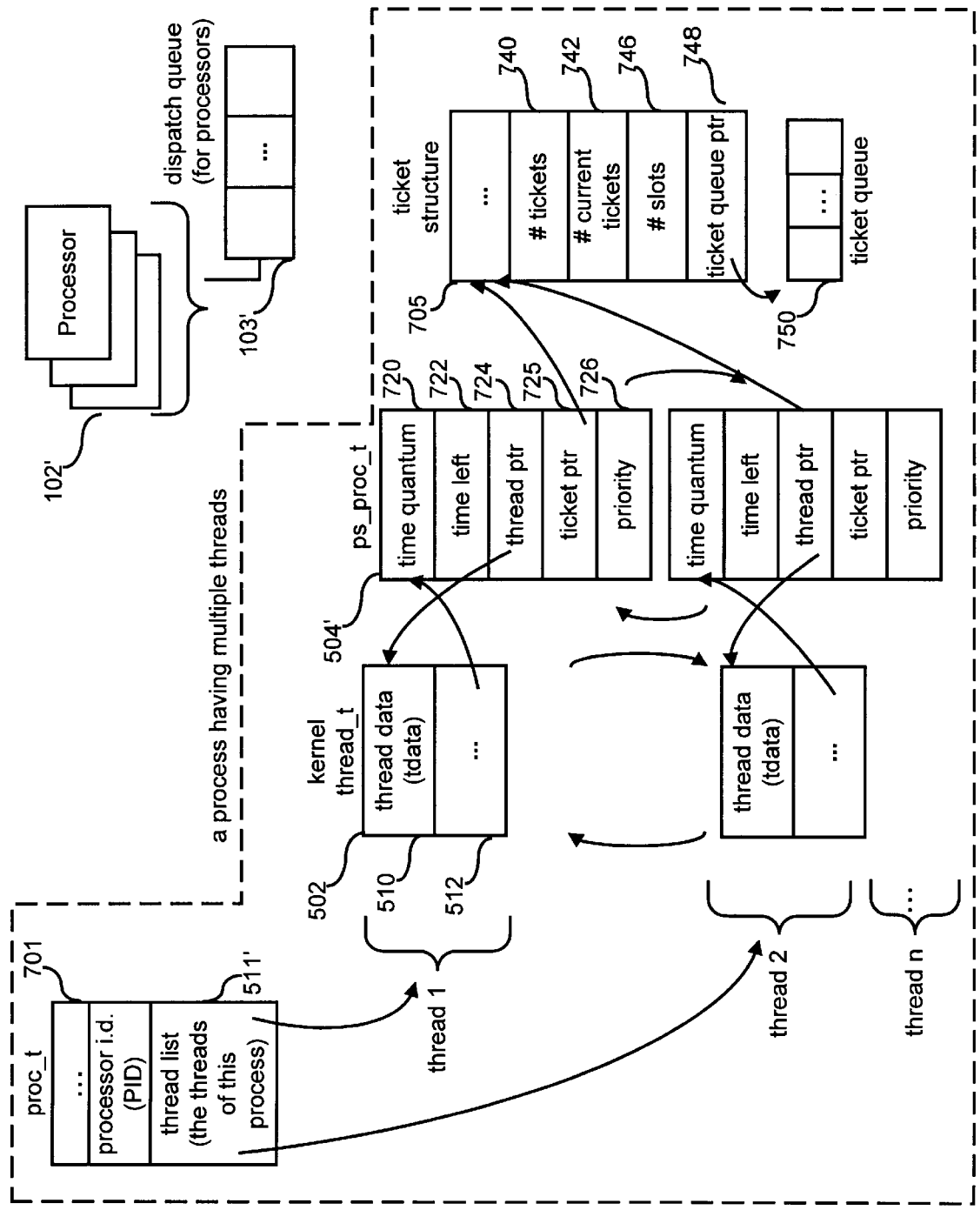
FIG. 7(b) shows an example of a data structure used to implement a preferred embodiment of the present invention in a system where multi-threaded applications share multiple processors (such as the system of FIG. 4).
Figure 8A:
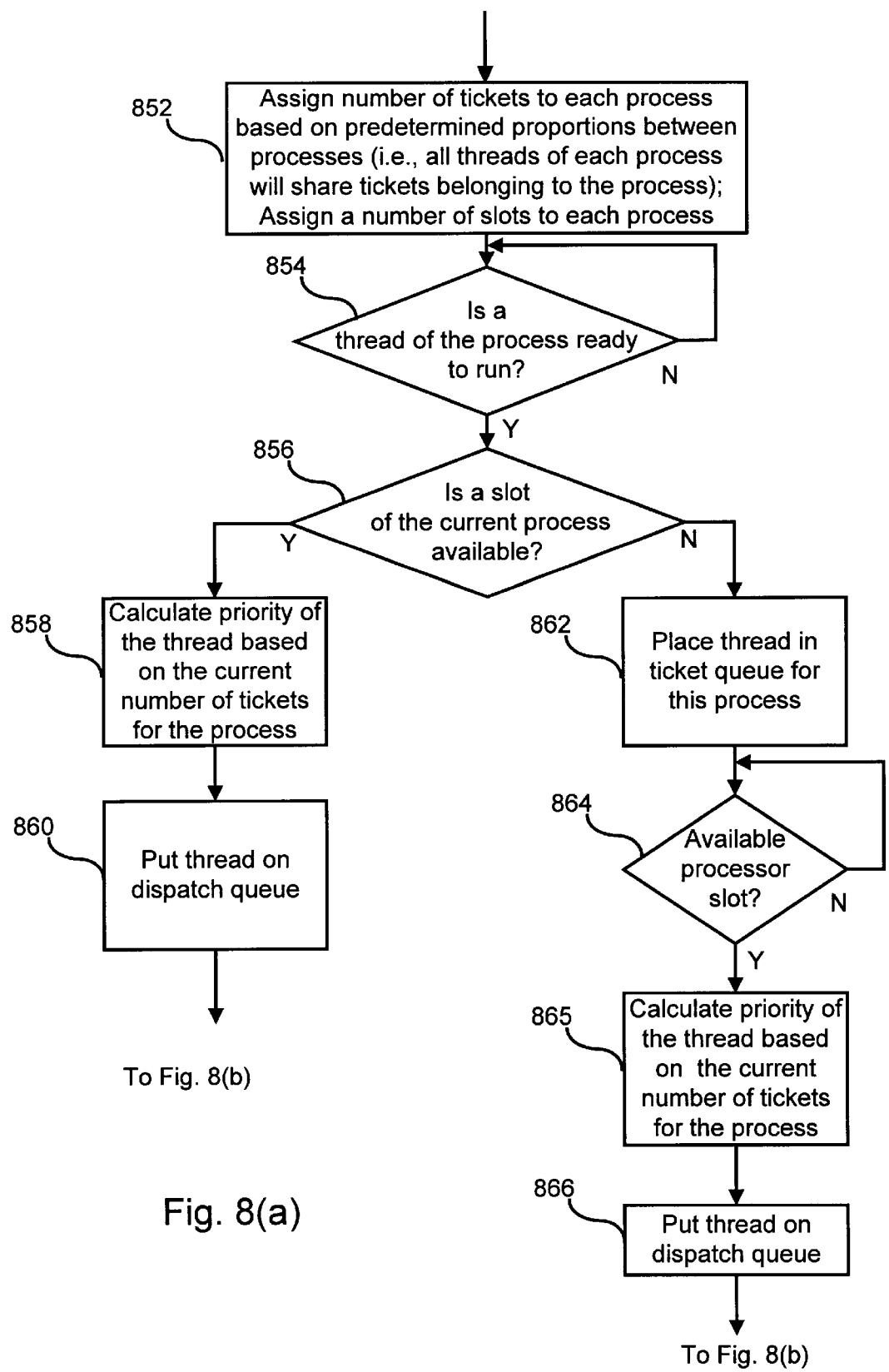
FIGS. 8(a) and 8(b) are flow charts showing steps using the data structure of FIGS. 7(a) or 7(b).
Figure 8B:
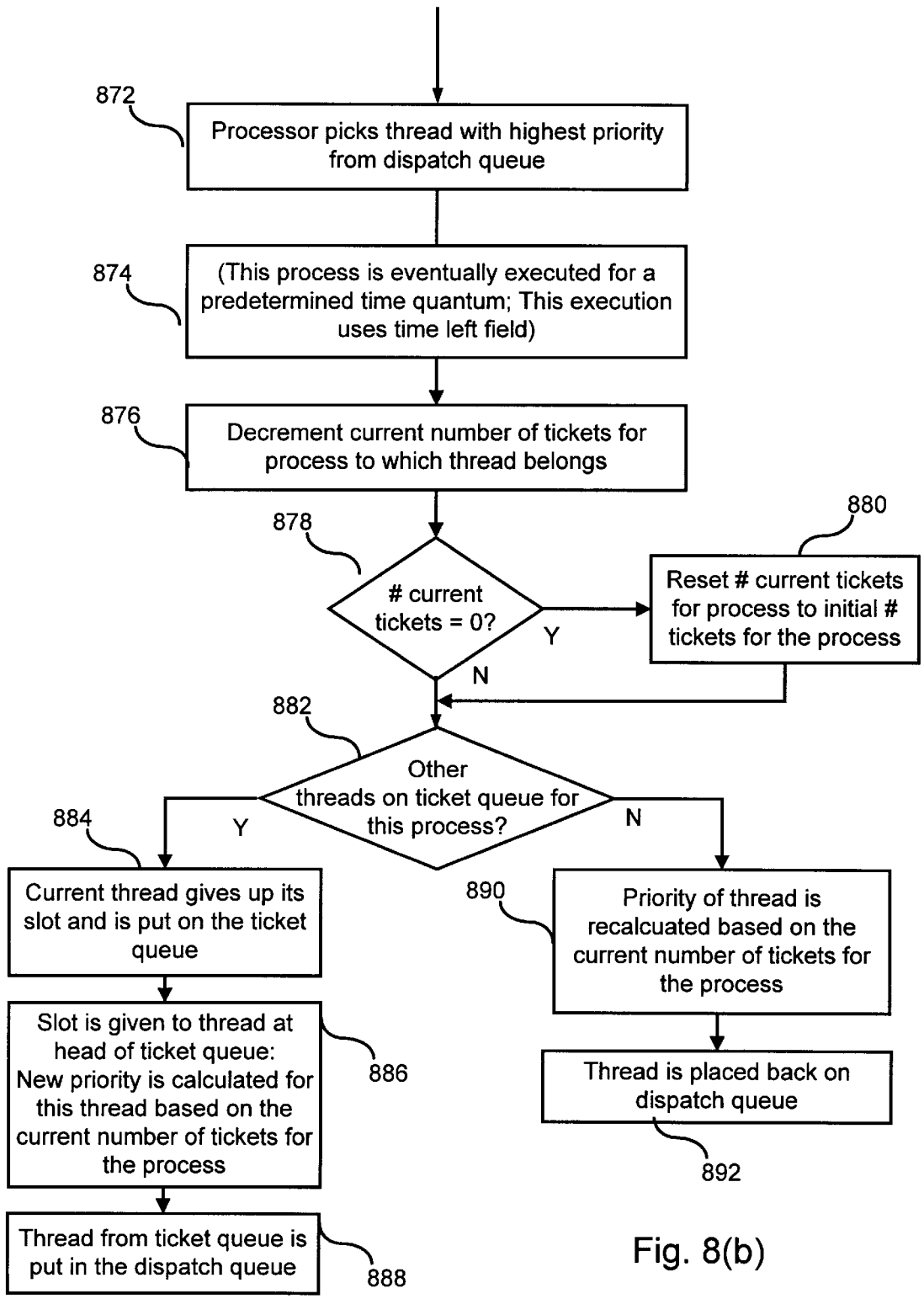

FIG. 7(a) shows an example of a data structure used to implement a preferred embodiment of the present invention in a single processor system capable of executing multi-threaded applications (such as the system of FIG. 3). FIG. 7(b) shows an example of a data structure used to implement a preferred embodiment of the present invention in a multi-processor system capable of executing multi-threaded applications (such as the system of FIG. 4). FIGS. 8(a) and 8(b) are flow charts showing steps using the data structure of FIGS. 7(a) or 7(b).

The data structure of FIGS. 7(a) and 7(b) are similar to the data structures of FIGS. 5(a) and 5(b), except that, in a system capable of executing multi-threaded applications, multiple threads in each application/process "share" the tickets of their process between them via a ticket data structure 705. It should be understood that the systems of FIGS. 7(a) and 7(b) can also include single-threaded applications (not shown), in addition to the multi-threaded applications. While each thread has its own priority 726, the tickets are held at the process level in fields 740 and 742 of ticket structure 705. Ticket data structure 705 also includes a ticket queue pointer 748 and a #slots field 746. The #slots field 746 indicates a number of processor slots is assigned to each process. In the case of a single processor system, the number of slots is always "1". A multiple processor system can have any number of slots less than or equal to the number of processors 102'. Ticket queue pointer 748 points to a ticket queue 750, whose function is to hold threads of a process that are waiting for a processor slot to become available. Threads to be executed are taken off ticket queue 750 and placed on dispatch queue 103 (or 103') for execution by processor 102 (or 102').

FIG. 8(*a*) show steps performed in connection with the multi-threaded applications of FIGS. 7(*a*) and 7(*b*) sharing single processor 102 or multiple processors 102'. In step 852 of FIG. 8(*a*), a number of tickets and a number of slots are assigned to each process. The priority of a thread is assigned based on the number of current tickets in the ticket structure 705 of its process when the priority is assigned. Thus, threads of a same process can have different priorities.

When a thread wants to use a processor 102, 102', it first checks to determine whether there is an available processor slot (step 856). If there is an available slot (i.e., no other thread is waiting in ticket queue 750), a priority is determined for the thread in step 858. This priority is placed in field 726 of the thread's ps_proc_t data structure 504' and the thread is placed in dispatch queue 103 for execution in step 860. Otherwise (if there are no available processor slots), the thread is placed in ticket queue 750 for this process (step 862). When a slot becomes available in step 864, a thread is taken off ticket queue 750 and its priority 726 is calculated based on the current number of tickets held by its process. The thread is then placed in dispatch queue 103 for execution.

FIG. 8(*b*) shows the steps for executing a thread after the thread is put on the system dispatch queue for execution by processor 102. After the thread has been executed for the predetermined number of time quanta in step 874, the #current tickets 742 for its process is reduced by "1" in step 876. If the number of tickets held is "0" in step 878, the number of tickets is reset to the initial value for the process in step 880 and control passes to step 882. Otherwise control passes directly to step 882.

In step 882, if other threads are on the ticket queue 750 for this process, the current thread gives up its slot in step 884 and is put back on ticket queue 750. Its slot is given to the thread at the head of ticket queue 750 and a new priority is calculated for this new thread based on the number of current tickets 742 for the process in step 886. This new thread (with its newly assigned priority) is placed on dispatch queue 103 for execution in step 888.

If, on the other hand, in step 882 there are no threads waiting in the ticket queue 750 when the current thread finishes execution, the priority of the current thread is recalculated based on the number of current tickets for the process in step 890 and the current thread is placed back on dispatch queue 103 in step 892 for execution. Note that steps 886 and 890 recalculate a priority of a thread based on the number of tickets currently held by the process to which the thread belongs.

Because the system of FIG. 7(*b*) includes multiple processors 102', each process is assigned a number 746 of "slots" equal, for example, to the number of processors in the system. Other implementations of the present invention may use other numbers of slots. For example, the number of slots could be smaller than the number of processors in the system in order to reduce the concurrency of execution of processes. In the described embodiment, if there are two processors in the system, the number of slots would be "2". Thus, for example, if there are only two processors 102' in the system and a process has ten threads, only two threads of the process at a time can be input to the system dispatch queue. The rest of the threads will wait on a ticket queue 750.

Thus, in a preferred embodiment of the present invention, tickets are assigned to processes, which are either a single thread application or a multi-threaded application. The processes can be executed by either a single-processor or a multi-processor system. The system determines which threads to execute next based on a priority of the thread, which is determined in accordance with a current number of tickets held by the process to which the thread belongs. In certain multi-processor systems, the system keeps tracks of the number of open processor slots and queues the waiting threads in a ticket queue if all processor slots are being used. In the described implementation, the ticket queue is a FIFO.

IV. Hierarchical proportional Sharing Between Users

Figure 9:
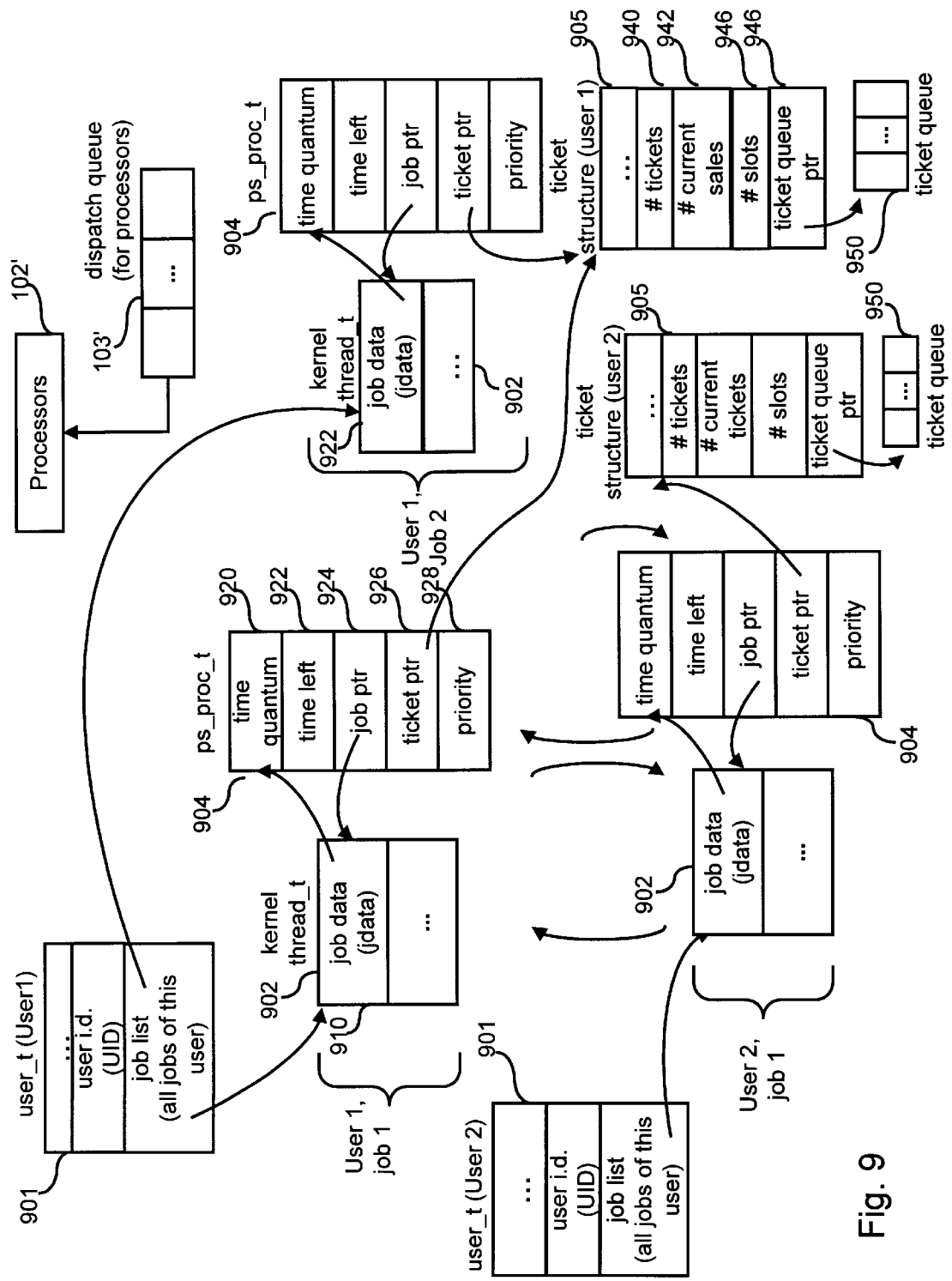
FIG. 9 shows an example of a data structure used to implement a preferred embodiment of the present invention in a system where multiple processors are shared among the jobs of a plurality of users.

FIG. 9 shows another variation of the present invention, called "hierarchical proportional sharing." In this variation, various users are preassigned proportional shares of system resources. Assume, for example, that users A and B share the system in an x:y ratio and that User A has three jobs, while User B has one job. User A can spread his share of the system among user A's three jobs in, for example, a 1:2:4 ratio. User B has only one job, so user B's job gets all of user B's share of system resources. Although FIG. 9 shows multiple processors, this embodiment can also be implemented in a single processor system.

The data structure of FIG. 9 is similar to the data structures of FIGS. 5–8, except that tickets are assigned to each user and are then shared by the jobs of the user. Although FIG. 9(*a*) shows a multiple processor system, hierarchical proportional sharing can also be implemented for a single processor system. While each job has its own priority 928, the tickets are held at the user level in fields 940 and 942 of ticket structure 905. Ticket structure 905 also includes a ticket queue pointer 948 and a #slots field 946. The #slots field indicates a number of slots assigned to each user. In the case of a single processor system, the number of slots is always "1". A multi-processor system can have a number of slots less than or equal to the number of processors. Ticket queue pointer 948 points to a ticket queue 950, whose function is to hold jobs of a user that are waiting for a processor slot to become available. Jobs to be executed are taken off ticket queue 950 and placed on dispatch queue 103' for execution by one of processors 102'.

Figure 10A:
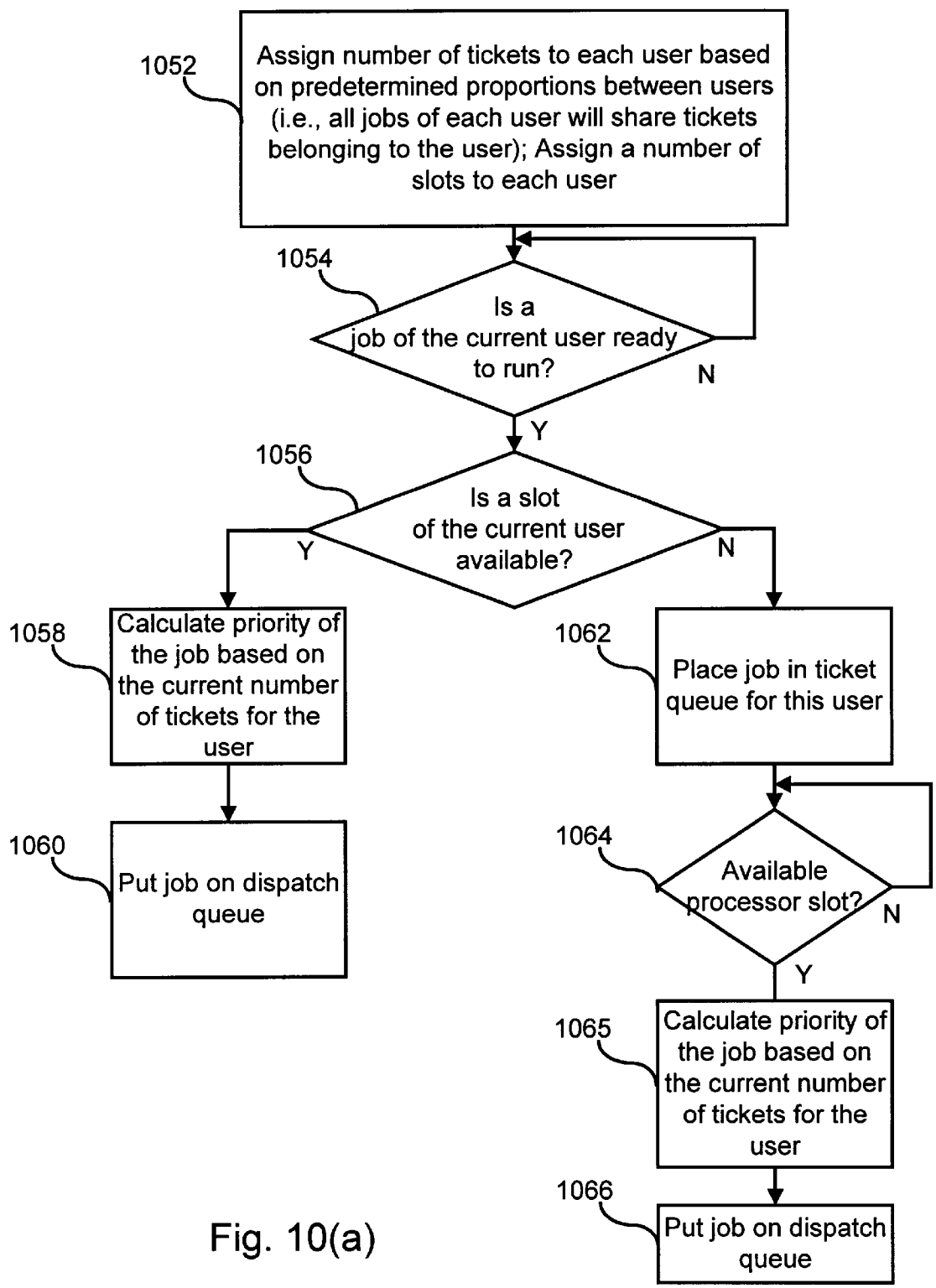
FIGS. 10(a) and 10(b) are flow charts showing steps performed in the data processing system of FIG. 9.
Figure 10B:
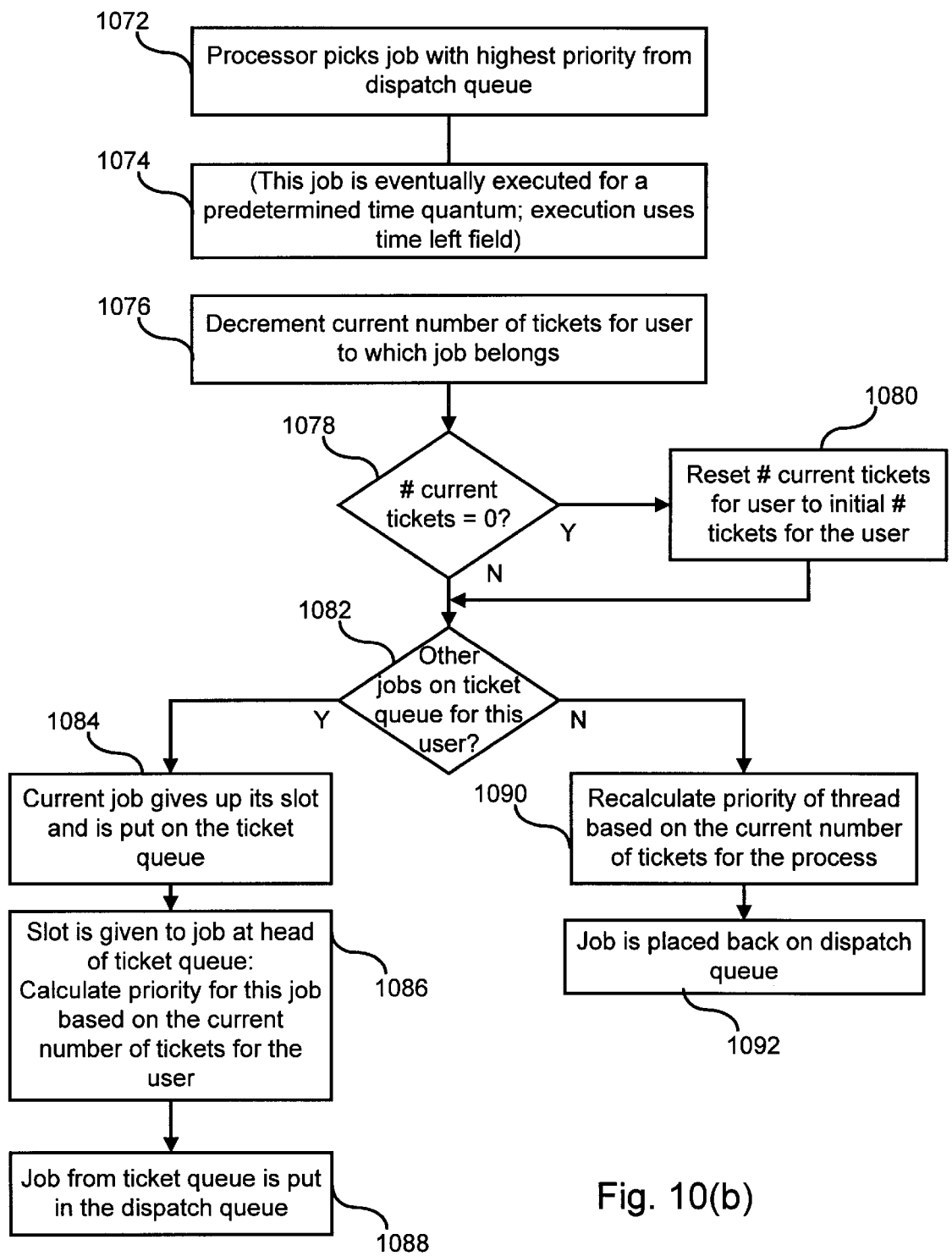

FIG. 10(*a*) show steps performed in connection with the hierarchical process sharing between users sharing multiple processors 102'. In step 1052 of FIG. 10(*a*), a number of tickets are assigned to each user. The priority of a job is based on the number of current tickets in the ticket structure 905 of its user when the priority is assigned. Thus, jobs of a same user can have different priorities.

When a job wants to use a processor 102', it first checks to determine whether there is an available processor slot (step 1056). If there is an available slot (i.e., no other job is waiting in ticket queue 950 of the job's user), a priority is determined for the job in step 1058 and the job is placed in dispatch queue 103' in step 1060 for execution. Otherwise (if there are no available processor slots), the job is placed in ticket queue 950 for this user (step 1062). When a slot becomes available in step 1064, a job is taken off ticket queue 950 and placed in dispatch queue 103' for execution.

FIG. 10(*b*) shows the steps for executing a job after the job is put on the system dispatch queue for execution by one of processors 102'. After the job has been executed for the predetermined number of time quanta in step 1074, the #current tickets 942 is reduced by "1" in step 1076. If the number of tickets held is "0" in step 1078, the number of tickets is reset to the initial value for the user in step 1080 and control passes to step 1082. Otherwise control passes directly to step 1082.

In step 1082, if other jobs are on the ticket queue of this user, the current job gives up its slot in step 1084 and is put back on ticket queue 950. Its slot is given to the job at the head of ticket queue 950 and a new priority is calculated for this new job based on the number of current tickets 942 for the user in step 1086. This new job (with its newly assigned priority) is placed on dispatch queue 103' in step 1086 for execution.

If, on the other hand, in step 1082 there are no jobs waiting in the ticket queue 950 when the current job finishes execution, the priority of the current job is recalculated based on the number of current tickets for the user in step 1090 and the current job is placed back on dispatch queue 103' in step 1092 for execution. Note that steps 1086 and 1090 recalculate a priority of a job based on the number of tickets currently held by the user to which the job belongs.

While the invention has been described in conjunction with a specific embodiment, it is evident that many alternatives, modifications and variations will be apparent to those skilled in the art in light of the foregoing description. For example, multiple processes can share a single pool of tickets (e.g., they may have a common ticket structure). Similarly, the threads in multiple processes can all share a single pool of tickets. In other implementations, a process can transfer some of its tickets to another process.

Accordingly, it is intended to embrace all such alternatives, modifications and variations as fall within the spirit and scope of the appended claims and equivalents.

What is claimed is:

1. A method of sharing at least one processor in a data processing system between a plurality of processes, including the steps, performed by the data processing system, of:

initially assigning a number of tickets to each of the plurality of processes;

assigning an initial priority to a thread of each of the plurality of processes in accordance with the number of tickets assigned to the process associated with the thread; and executing the respective threads of the plurality of processes in an order indicated by the tickets assigned to the plurality of processes, so that the proportion of execution time between any two of the threads is the same as the proportion between the number of tickets of the two processes associated with the threads.

2. The method of claim 1, wherein the data processing system includes a plurality of processors, and the data processing system has a plurality of processor slots;

wherein the executing step includes the step of determining whether there is an available processor slot; and further including the step of placing a thread associated with a one of the plurality of processes on a ticket queue of the process, when there is no available processor slot, so that the thread waits on the ticket queue for an available processor slot.

3. The method of claim 1, wherein the data processing system includes a plurality of processors, and the data processing system has a plurality of processor slots;

wherein the executing step includes the step of determining whether there is an available processor slot; and further including the step of placing a thread associated with a one of the plurality of processes onto a processor dispatch queue when there is an available processor slot.

4. The method of claim 3, further including the step of calculating a priority of the thread in accordance with the number of tickets currently held by the thread's process before the thread is placed on the dispatch queue.

5. The method of claim 4, wherein the executing step includes the steps of:

decrementing a number of tickets of a one of the plurality of processes whose thread has just finished executing for a predetermined time period; and if the number of tickets for the one process is equal to zero after the decrementing step, setting the number of tickets for the one process to the initially determined number of tickets for the one process.

6. The method of claim 4, wherein the executing step includes the steps of recalculating the number of tickets held by the process; after the thread of the process has executed for the predetermined period of time.

7. The method of claim 4, wherein the executing step includes the steps of checking whether there is another thread with a higher priority; after the thread has finished executing for the predetermined period of time.

8. The method of claim 1, wherein at least one of the plurality of processes is a multi-threaded application.

9. A method of sharing a processor between a plurality of threads of a plurality of multi-threaded applications in a data processing system, including the steps, performed by the data processing system, of:

initially assigning respective numbers of tickets to each of the plurality of multi-threaded applications;

assigning a priority to each of the plurality of multi-threaded applications in accordance with a number of tickets assigned to each multi-threaded application;

adding a thread of at least one of the plurality of multi-threaded applications to a dispatch queue when room becomes available for another thread on a dispatch queue; and adding a thread of at least one of the plurality of multi-threaded applications to a ticket queue, when there is not room for another process on the dispatch queue.

10. A method of sharing at least one processor between a plurality of threads of a first multi-threaded process and a plurality of threads of a second multi-threaded process in a data processing system, including the steps, performed by the data processing system, of:

initially assigning a respective numbers of tickets to the first and second multi-threaded processes;

assigning a priority to at least one thread of each of the first and second multi-threaded processes in accordance with the number of tickets assigned to each multi-threaded process; and executing the threads of the first and second multi-threaded processes in an order indicated by the tickets assigned to their respective multi-threaded process, so that the proportion of execution time between any two of the processes is the same as the proportion between the number of tickets of the two multi-threaded processes.

11. A data structure stored in a memory storage area of a data processing system, comprising:

a data structure representing a first thread of a multi-threaded process;

a data structure representing a second thread of a multi-threaded process; and a ticket queue data structure, that is pointed to by the data structures representing the first and second threads, where the ticket queue data structure stores a value indicating an initial number of tickets for the multi-threaded process to which the first and second threads belong and further storing a value indicating a current number of tickets for the multi-threaded process.

12. A method of sharing at least one processor between a plurality of users in a data processing system, where the users each have a plurality of jobs to execute, including the steps, performed by the data processing system, of:

initially assigning a number of tickets to each of the plurality of users;

assigning a priority to each of the plurality of jobs in accordance with the number of tickets assigned to each user; and executing jobs belonging to the plurality of users in an order indicated by the tickets assigned to the plurality of users, so that the proportion of execution time between jobs of any of the two users is the same as the proportion between the number of tickets of the two users.

13. A method of sharing at least one processor between a plurality of threads in multiple processes, comprising:

initially assigning a number of tickets to the plurality of processes; where the tickets are assigned to the plurality of processes as a pool;

assigning a priority to two threads associated with two of the plurality of processes, in accordance with the number of tickets assigned to the plurality of processes; and executing the two threads in an order indicated by the tickets assigned to the processes with which the threads are associated, so that the proportion of execution time between the two threads is the same as the proportion between the number of tickets of the two processes.

14. A computer program product, including:

a computer usable medium having computer readable code embodied therein for causing proportional execution times between two threads of two processes, the computer program product comprising:

computer readable program code devices configured to cause a computer to effect initially assigning a number of tickets to each of the plurality of processes;

computer readable program code devices configured to cause a computer to effect assigning a priority to each of the plurality of processes in accordance with the number of tickets assigned to each process; and computer readable program code devices configured to cause a computer to effect executing the plurality of processes in an order indicated by the tickets assigned to the plurality of processes, so that the proportion of execution time between any two of the processes is the same as the proportion between the number of tickets of the two processes.

15. A computer data signal embodied in a carrier wave and representing sequences of instructions which, when executed by a processor, cause the processor to share at least one processor in a data processing system between a plurality of processes, by performing the steps of:

initially assigning a number of tickets to each of the plurality of processes;

assigning a priority to each of the plurality of processes in accordance with the number of tickets assigned to each process; and executing the plurality of processes in an order indicated by the tickets assigned to the plurality of processes, so that the proportion of execution time between any two of the processes is the same as the proportion between the number of tickets of the two processes.

16. An apparatus that proportionally shares at least one processor in a data processing system between a plurality of processes, the apparatus comprising:

a portion configured to initially assign a number of tickets to each of the plurality of processes;

a portion configured to assign a priority to each of the plurality of processes in accordance with the number of tickets assigned to each process; and a portion configured to execute the plurality of processes in an order indicated by the tickets assigned to the plurality of processes, so that the proportion of execution time between any two of the processes is the same as the proportion between the number of tickets of the two processes.

17. An apparatus that proportionally shares at least one processor between a plurality of threads of a plurality of multi-threaded applications, the apparatus comprising:

a portion configured to initially assign respective numbers of tickets to each of the plurality of multi-threaded applications;

a portion configured to assign a priority to each of the plurality of multi-threaded applications in accordance with a number of tickets assigned to each multi-threaded application;

a portion configured to add a thread of at least one of the plurality of multi-threaded applications to a dispatch queue when room becomes available for another thread on a dispatch queue; and a portion configured to add a thread of at least one of the plurality of multi-threaded applications to a ticket queue, when there is not room for another process on the dispatch queue.

* * * * *